United States Patent [19]
Van Aarsen

[11] Patent Number: 6,143,171
[45] Date of Patent: Nov. 7, 2000

[54] MAGNETIC DEVICE FOR TREATMENT OF FLUIDS

[76] Inventor: Freda Martha Van Aarsen, 2950 Lawrence Ave. East, Suite 318, Toronto, Ontario, Canada, M1P 2T9

[21] Appl. No.: 09/287,271

[22] Filed: Apr. 7, 1999

[51] Int. Cl.$^7$ ............................... B01D 35/06; B03C 1/14
[52] U.S. Cl. ................................ 210/222; 210/695; 96/1; 123/538
[58] Field of Search ..................................... 210/222, 223, 210/695; 96/1; 123/536, 538; 422/186.01

[56] References Cited

U.S. PATENT DOCUMENTS

| | | | |
|---|---|---|---|
| 4,153,559 | 5/1979 | Sanderson | 210/222 |
| 4,216,092 | 8/1980 | Shalhoob et al. | 210/222 |
| 5,882,514 | 3/1999 | Fletcher | 210/222 |

Primary Examiner—David A. Reifsnyder

[57] ABSTRACT

A magnetic treatment device for the treatment of fluids, the device having several permanent magnets, and in which the magnetic fields around the magnets are intensified and concentrated and in which the treatment of the fluid is enhanced, and having, a non-ferrous tubular housing, a plurality of permanent magnets within the housing defining north and south poles, the magnets being arranged in a column with like poles facing one another, a plurality of magnetically permeable plates located between ends of adjacent magnets, and, a magnetically permeable intensifier ring located around the outside of the non-ferrous housing, the ring being positioned at the point defining the median of the column of magnets. The magnitude of the flux density expressed in gauss around the non-ferrous housing is extremely dense and more than sufficient for magnetic treatment, and a major consideration in the effectiveness of the system.

11 Claims, 2 Drawing Sheets

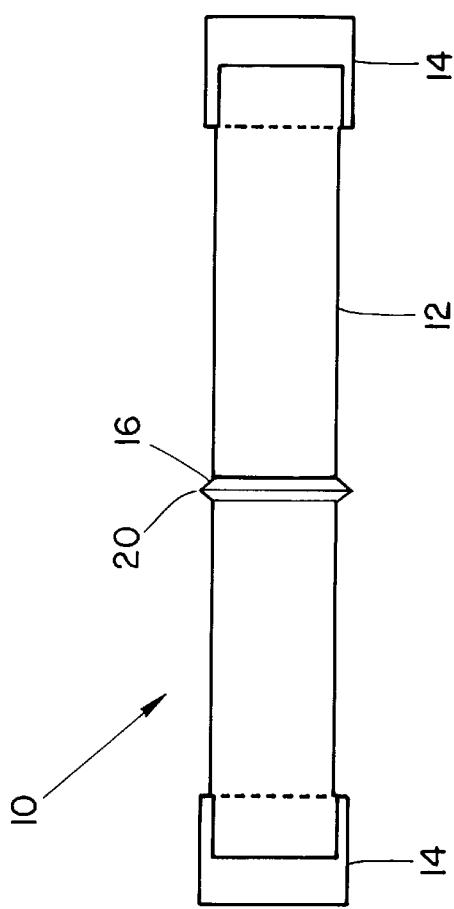
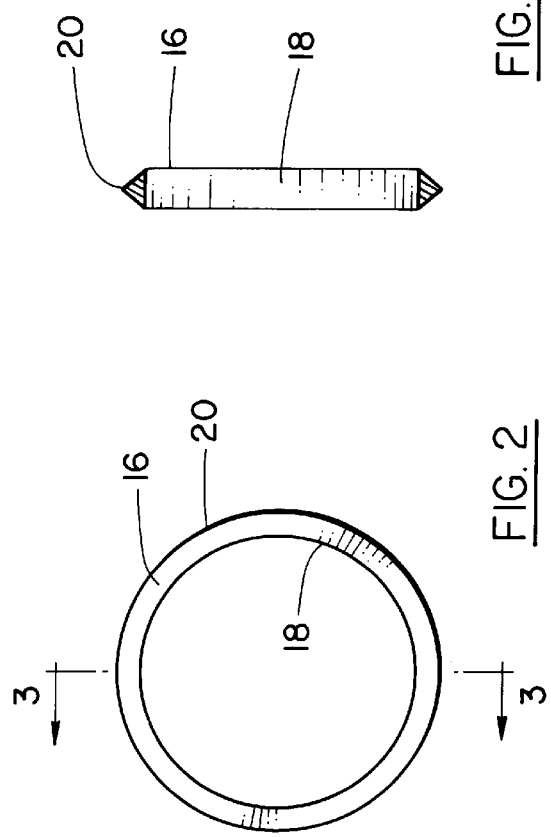

MAGNETIC DEVICE FOR TREATMENT OF FLUIDS

FIELD OF THE INVENTION

The invention relates to a magnetic device for the treatment of fluids, including liquids such as water, milk, crude oil, and gases, such as engine exhaust, factory effluent, and other fluids both liquid and gaseous, requiring treatment.

BACKGROUND OF THE INVENTION

The use of both permanent magnets and electromagnets for the treatment of fluids, has been known for many years. In recent years many important breakthroughs have been made in magnetic fluid conditioning and many large industries have magnetic fluid conditioning equipment working satisfactorily for the past twenty years or more. Numerous patents exist disclosing such systems including those listed herein.

These patents include the following namely; U.S. Pat. Nos. 5,605,587, 4,428,837, 5,738,766, 5,759,391, 5,783,074, 5,656,171, 5,667,677, 5,670,041, 5,673,721, 5,683,579, 5,705,064, 5,716,520, 4,935,133, 5,439,586, 4,999,106, 5,178,757, 5,468,378, 5,304,302, 5,271,834, 5,221,471, 5,540,835, 58044067.

The basic principle and theory behind all of them seems to be that matter is made up of molecules, which in turn are composed of atoms having definitely recognisable electrical characteristics. Each atom consists of a positive mass or core, surrounded by a revolving negative mass of one or more electrons, disposed in concentric rings or orbits. The whole atom is held together by an invisible, cohesive force. Each electron has two motions: a rotational or spin motion, and a revolving or orbital motion. Likewise, each electron develops two magnetic fields, one perpendicular to the direction of travel, and the other a circular field, following the direction travelled. The intensity of these fields is proportional to the mass and speed of the electrons. It is these magnetic fields or links which hold the electrons in fixed relation to each other.

Chemical reactions take place through the modification in the cohesion of the electrons revolving in the outer rings or orbits of atoms, specifically, if the magnetic fields or links of these outer electrons are disturbed, a reaction will result.

The magnetic fields of the outer ring of electrons can be crossed by magnetic links produced from an external force. The resultant change in the direction of the fields will cause sufficient modification in the cohesive force within the atoms and molecules to alter the molecular structure.

Crystallization originates in the harmonious vibratory motion of two or more molecules of dissolved minerals or salts, to which molecules of water and other molecules of dissolved minerals or salts are attracted. By imparting to the water and salt molecules additional electrical energy, and establishing a single magnetic filed direction the harmony of the crystallization is upset, and intra molecular cohesion is broken. This occurrence will cause a dissolution of any existing scale forming crystals, and will prevent the formation of any new crystals. These crystals are in the form of a metastable compound called "Aragonite". Aragonite does not bond together easily and thus scale buildup is prevented. Aragonite crystals are in the form of a fine powder when dry. Scale occurs when dissolved minerals and salts (particles of hardness) in solution are activated by heat. In solution the magnetic ion is surrounded by water molecules, forming a crystalline structure similar to the crystals formed by hydrated minerals and salts. The various magnetic fields of these molecular groups are of sufficient intensity to combine at the heat point of attraction, and lattice (intertwine) forming a solid calcium carbonate deposit, commonly called scale. This system prevents these deposits of scale from forming. the minerals are rendered into a soft mud and are readily removed from the system by flushing or are carried with the flow to the low point of the piping system.

In operation a thin film of aragonite talc, much like a protective coating of oil will be deposited on the interior surfaces of the system. This powdery coating prevents free gases from attacking the metal it coats, thereby eliminating corrosion.

Hundreds of thousands of magnetic fluid conditioning units are in use throughout the world, with East Block countries having developed this technology over the last fifty years. The industry may be compared to the silicon chip industry. It is definitely not a newcomer to technology, but is expected to replace at least fifty percent of chemical and other treatment methods, within the next thirty years.

BRIEF SUMMARY OF THE INVENTION

The invention seeks to provide a magnetic treatment device for the treatment of fluids in which there are a plurality of permanent magnets, and in which the magnetic fields around the magnets are intensified and concentrated and in which the treatment of the fluid is enhanced to a point where the treatment becomes effective.

The fluid is directed to flow within a conduit of copper around the outside of a non-magnetic housing, and is subjected to the intense magnetic force fields created by the permanent magnets of opposite polarity in the fluid flow which surrounds the non-magnetic housing, so that the fluid flows at a substantial angle to the lines of flux and straight through the system. The magnetic device is essentially a magnetic generator, which supplies the external force necessary to disturb the magnetic linkage between the outer ring electrons of the atoms in the molecules of the various dissolved minerals and salts and orients their magnetic fields in a common direction.

In accordance with the invention there are at least eight permanent magnets each defining north and south poles, and located end to end, in line, within a nonmagnetic tubular housing, with like poles facing one another, and a plurality of steel discs located between ends of adjacent magnets, and there being a magnetically permeable ring located around the outside of the nonmagnetic housing, the ring being positioned at the point defining the median of the line of magnets.

As the fluids pass through the force fields and flow over the ring, it creates unusual magnetic intensity, which imparts extra magnetic energy to the electrons. Direction of flow is perpendicular to the magnetic fields of the system, so the molecules and dissolved minerals and salts contained in the fluid are subjected to a series of violent intramolecular vibrations and shocks at the same time that magnetic energy is being added. The result is an alignment of electrons of the atoms and molecules of dissolved minerals and salts in a single direction.

In the case of eight magnets the ring will be located adjacent the location of the magnetic permeable plate between the abutting poles of magnets four and five, but outside the nonmagnetic housing.

Preferably the ring is a simple continuous annulus lying in a plane normal to the axis of the magnets and is formed with a uniform transverse cross section in the form of a triangle, and preferably an equilateral triangle, with the base of the triangle lying on the exterior on the nonmagnetic housing, and with the apex directed outwardly.

The fluid is directed to flow within the tube, longitudinally around the outside of the housing, and, as explained, is thus subjected to the intense magnetic fields developed by the permanent magnets, which surround the nonmagnetic housing, so that the fluid flows at a substantial angle to the lines of force along the length of the housing.

The intensifier ring acts both to intensify the magnetic fields, and also to create some additional turbulence in the flowing fluid, where it is diverted to flow over the ring, and this is believed to have a significant effect in enhancing the magnetic treatment to which the fluid is subjected.

The ring is preferably attached to the housing by means such as permanent adhesive, or other suitable means, hold it permanently against displacement.

Preferably the housing is made of copper, and the intensifier ring is made of steel, so as to give the treatment device an extended working life even in a relatively harsh environment.

The magnitude of the flux density expressed in gauss, around the tubular housing is extremely dense, and is more than sufficient for magnetic treatment, and is a significant consideration in the effectiveness of the system.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a side elevation, partly in phantom showing in schematic form a treatment device illustrating the invention;

FIG. 2 is an end elevation of the intensifier ring of FIG. 1;

FIG. 3 is a section along the line 3—3 of FIG. 2;

Figure 4:
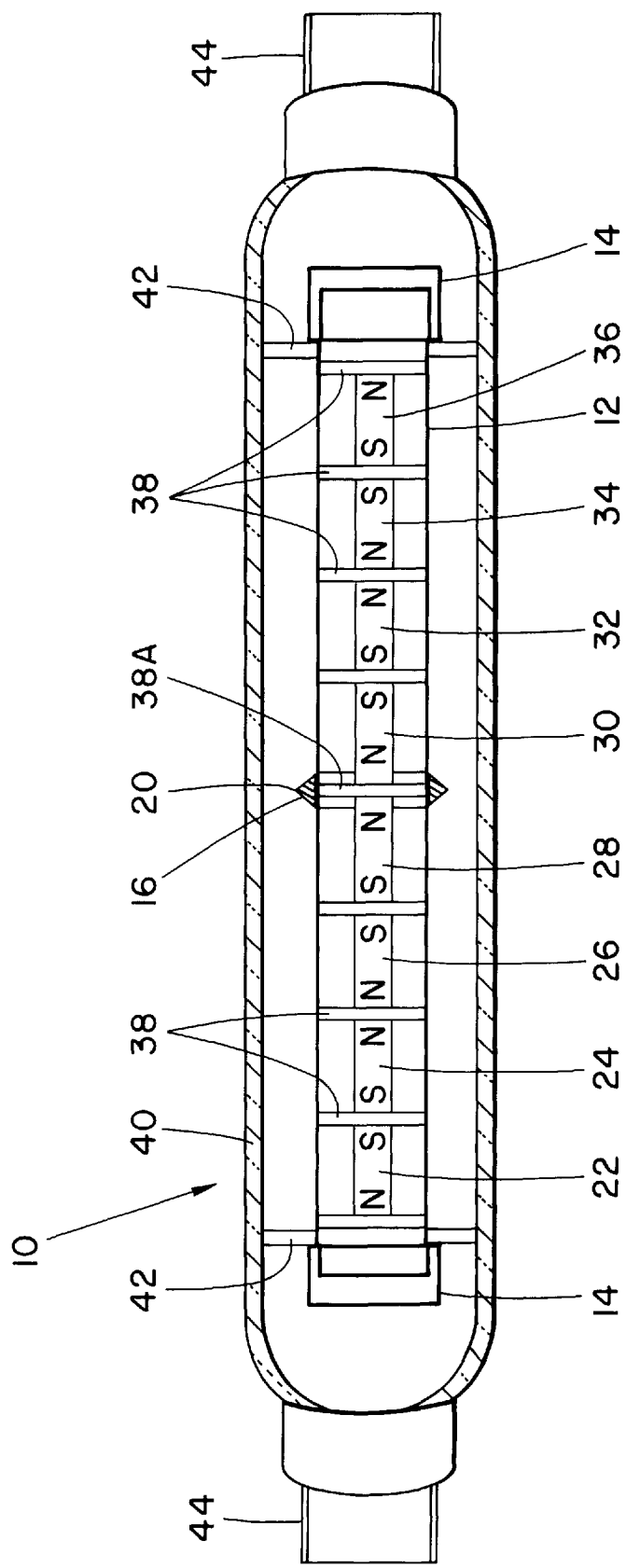
FIG. 4 is a schematic longitudinal section of a treatment device embodying the principles of FIG. 1 illustrating the positioning of the magnets, and shown in position in a fluid flow conduit.

DESCRIPTION OF A SPECIFIC EMBODIMENT.

As explained above the invention has application to the treatment of fluids, both gases and liquids, and consequently can be installed in various fluid flow systems where fluids can flow longitudinally around the treatment device without essentially disturbing or diverting the general flow of fluids in the system.

Referring first to FIG. 1 the treatment device 10 is generally shown as comprising a tubular cylindrical housing 12 with ends caps 14—14. The housing 12 can be formed of any nonmagnetic material which will be suitable for the fluid environment in which it is to be used. In the example shown the device may be considered as directed to the treatment of water in a water flow system, although the invention is not to be considered as limited solely to water treatment. For this purpose copper is a suitable material for housing 12 being both economical and easily adapted to this use. The housing end caps 14 are also typically of copper in this example.

As will be described below the housing 12 contains a plurality of permanent magnets, arranged end to end, and a plurality of magnetically permeable discs, or "keepers" located between adjacent ends of the magnets. The end caps 14 are soldered or otherwise sealed or secured for example by means of permanent adhesive to the housing 12 so as to prevent flow of fluids within housing 12.

Midway along the length of housing 12 there is the intensifier ring 16, which is secured by any suitable means such as permanent adhesive or other suitable means, to the outside of housing 12. Intensifier ring is a continuous regular annulus lying in a plane normal to the axis of the magnets and 16 is formed in this embodiment with a cross section in the shape of an equilateral triangle (FIGS. 3 and 4). The base 18 of the triangle is secured to the housing 12 and the apex 20 of the triangle extends away from the housing 12.

As shown in FIG. 4 the device 10 contains, in this embodiment, eight permanent magnets indicated as 22,24, 26,28,30,32, 34, and 36, which are arranged end to end in a column. Magnet 22 is at the left hand end of the column and magnet 36 is at the right hand end. Magnetically permeable discs 38 are located between the ends of adjacent magnets. Further discs 38 are also located against the free ends of magnets 22 and 24. The poles of magnets 22 to 36 are arranged so that north faces north and south faces south in each of the adjacent pairs of magnets. The discs 38 are placed between adjacent like poles of each pair of magnets.

Intensifier ring 16 is located on the exterior of housing 12 registering with the disc 38A placed between the adjacent ends of magnets 28 and 30.

In use the housing 12 is secured along the central axis of a fluid flow conduit 40, being supported by any suitable means such as rods or spokes 42.

Conduit 40 is adapted to be connected in a fluid flow system (not shown) by end connections 44, which represent any suitable form of fluid coupling whether for a gas flow system or a liquid flow system (not shown) which may permit effective coupling.

Fluid, either a gas or a liquid, will flow through conduit 40 from one end to the other. The fluid will thus be forced to flow lengthwise around housing 12 and will pass straight through the magnetic fields of the permanent magnets within the housing.

The magnitude of the flux density expressed in gauss is intensified by the intensifier ring, around the tubular housing and is extremely dense, and is more than sufficient for magnetic treatment, and is a significant consideration in the effectiveness of the system. Magnetically treated fluid is found to be effective to remove old built up scale from piping systems for example, and from appliances because of the ability of dissolved iron to carry the magnetic charge beyond the magnetic treatment unit, and to magnetically affect the iron within the hard calcite structure causing calcite bonds to distort and disassociate.

The service life of the equipment or circulation system is thus extended by eliminating or reducing damage caused by salts, acids, chemicals and mechanical rusting out.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A magnetic treatment device for the treatment of fluids and in which magnetic fields are intensified and concentrated and in which the treatment of the fluid is enhanced, the magnetic treatment device comprising;

a non-magnetic tubular housing;

a plurality of permanent magnets within the housing, each magnet defining north and south poles, the magnets being arranged in a column with like poles facing one another;

a plurality of steel discs located between ends of adjacent magnets, and, a magnetically permeable intensifier ring located around the outside of the housing, the ring being formed with a uniform transverse cross section in the form of a triangle and being positioned at the point defining the median of the column of magnets.

2. A magnetic treatment device as claimed in claim 1 wherein there are eight magnets, and in which the intensifier ring is located adjacent the location of the steel disc between the abutting poles of magnets four and five, along the column.

3. A magnetic treatment device as claimed in claim 1 in which there are at least eight permanent magnets each defining north and south poles, and located end to end, in the column.

4. A magnetic treatment device as claimed in claim 1, wherein the housing defines an interior and an exterior and wherein the intensifier ring defines, in section, an equilateral triangle defining a base and an apex, with the base of the triangle lying on the exterior on the housing, and with the apex of the triangle directed outwardly from the housing.

5. A magnetic treatment device as claimed in claim 1 wherein the device is adapted to be mounted in a fluid flow conduit, wherein the fluid is directed to flow through the conduit, longitudinally around the outside of the housing, through the intensified magnetic force fields developed by the permanent magnets.

6. A magnetic treatment device as claimed in claim 5 wherein the intensifier ring creates magnetic intensity and the flowing fluid is diverted to flow over the ring.

7. A magnetic treatment device as claimed in claim 1 wherein the ring is attached to the housing by permanent adhesive.

8. A magnetic treatment device as claimed in claim 1 wherein the housing is made of copper, and the intensifier ring is made of steel and chromium.

9. A magnetic treatment device as claimed in claim 5 and including support rods extending from the housing for supporting the housing within a fluid conduit.

10. A magnetic treatment device as claimed in claim 1 and including further steel discs located on the magnets at opposite ends of the column of magnets, within the housing.

11. A magnetic treatment device as claimed in claim 1 including non-magnetic end caps closing said housing to prevent entry of fluids therein.

* * * * *